United States Patent
Laddha et al.

(10) Patent No.: US 10,310,087 B2
(45) Date of Patent: Jun. 4, 2019

(54) RANGE-VIEW LIDAR-BASED OBJECT DETECTION

(71) Applicant: Uber Technologies, Inc., San Francisco, CA (US)

(72) Inventors: Ankit Laddha, Pittsburgh, PA (US); J. Andrew Bagnell, Pittsburgh, PA (US); Varun Ramakrishna, Pittsburgh, PA (US); Yimu Wang, Pittsburgh, PA (US); Carlos Vallespi-Gonzalez, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 30 days.

(21) Appl. No.: 15/609,256

(22) Filed: May 31, 2017

(65) Prior Publication Data

US 2018/0348374 A1     Dec. 6, 2018

(51) Int. Cl.
  *G06K 9/00*     (2006.01)
  *G01S 17/89*    (2006.01)
  (Continued)

(52) U.S. Cl.
  CPC ............ *G01S 17/89* (2013.01); *G01S 7/4808* (2013.01); *G01S 17/66* (2013.01); *G01S 17/936* (2013.01);
  (Continued)

(58) Field of Classification Search
  CPC .... G01S 7/4865; G01S 7/4863; G01S 7/4815; G01S 17/89; G01S 17/50; G01S 17/936;
  (Continued)

(56) References Cited

U.S. PATENT DOCUMENTS

| | | | |
|---|---|---|---|
| 8,825,260 B1 * | 9/2014 | Silver | G01S 17/936 342/118 |
| 9,234,618 B1 * | 1/2016 | Zhu | G01S 17/10 |

(Continued)

OTHER PUBLICATIONS

Chen et al., "Multi-View 3D Object Detection Network for Autonomous Driving", arXiv:1611.07759v2, Apr. 11, 2017, 9 pages.
(Continued)

*Primary Examiner* — Amara Abdi
(74) *Attorney, Agent, or Firm* — Dority & Manning, P.A.

(57) ABSTRACT

Systems and methods for detecting and classifying objects that are proximate to an autonomous vehicle can include receiving, by one or more computing devices, LIDAR data from one or more LIDAR sensors configured to transmit ranging signals relative to an autonomous vehicle, generating, by the one or more computing devices, a data matrix comprising a plurality of data channels based at least in part on the LIDAR data, and inputting the data matrix to a machine-learned model. A class prediction for each of one or more different portions of the data matrix and/or a properties estimation associated with each class prediction generated for the data matrix can be received as an output of the machine-learned model. One or more object segments can be generated based at least in part on the class predictions and properties estimations. The one or more object segments can be provided to an object classification and tracking application.

19 Claims, 10 Drawing Sheets

(51) Int. Cl.
    *G01S 17/93*     (2006.01)
    *G01S 17/66*     (2006.01)
    *G01S 7/48*     (2006.01)
    *G01S 17/50*     (2006.01)
    *G01S 13/93*     (2006.01)

(52) U.S. Cl.
    CPC ..... *G06K 9/00201* (2013.01); *G06K 9/00805* (2013.01); *G01S 13/931* (2013.01); *G01S 17/50* (2013.01)

(58) Field of Classification Search
CPC . G01S 17/42; G06K 9/00805; G06K 9/00201
See application file for complete search history.

(56) References Cited

U.S. PATENT DOCUMENTS

| | | | |
|---|---|---|---|
| 2009/0310822 A1* | 12/2009 | Chang | G06T 7/11 |
| | | | 382/103 |
| 2017/0371329 A1* | 12/2017 | Giering | G05B 23/0254 |
| 2018/0136332 A1* | 5/2018 | Barfield, Jr. | G01S 17/42 |
| 2018/0239357 A1* | 8/2018 | Kim | G01S 7/4802 |

OTHER PUBLICATIONS

Li et al., "Vehicle Detection from 3D Lidar Using Fully Convolutional Network", arXiv:1608.07916, Apr. 11, 2017, 8 pages.
Petrovskaya et al., Model Based Vehicle Tracking for Autonomous Driving in Urban Environments, Proceedings of robotics: Science and systems IV, Zurich, Switzerland, 2008, 8 pages.
Zelener, Survey of Object Classification in 3D Range Scans, Technical Report, 2015, 32 pages.

\* cited by examiner

RANGE-VIEW LIDAR-BASED OBJECT DETECTION

FIELD

The present disclosure relates generally to detecting objects of interest. More particularly, the present disclosure relates to detecting and classifying objects that are proximate to an autonomous vehicle using range-view LIDAR-based object detection.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

Thus, a key objective associated with an autonomous vehicle is the ability to perceive objects (e.g., vehicles, pedestrians, cyclists) that are proximate to the autonomous vehicle and, further, to determine classifications of such objects as well as their locations. The ability to accurately and precisely detect and characterize objects of interest is fundamental to enabling the autonomous vehicle to generate an appropriate motion plan through its surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of detecting objects of interest. The method includes receiving, by one or more computing devices, LIDAR data from one or more LIDAR sensors configured to transmit ranging signals relative to an autonomous vehicle. The method includes generating, by the one or more computing devices, a data matrix comprising a plurality of data channels based at least in part on the LIDAR data and inputting, by the one or more computing devices, the data matrix comprising a plurality of data channels to a machine-learned model. The method includes receiving, by the one or more computing devices as an output of the machine-learned model, a class prediction for each of one or more different portions of the data matrix and receiving, by the one or more computing devices as an output of the machine-learned model, a properties estimation associated with each class prediction generated for the data matrix. The method includes generating, by the one or more computing devices, one or more object segments based at least in part on the class predictions and properties estimations and providing, by the one or more computing devices, the one or more object segments to an object classification and tracking application.

Another example aspect of the present disclosure is directed an object detection system. The object detection system includes one or more processors, a machine-learned prediction model that has been trained to receive a data matrix comprising multiple channels of LIDAR-associated data and, in response to receipt of the data matrix, output one or more class predictions for different portions of the data matrix, and at least one tangible, non-transitory computer readable medium that stores instructions that, when executed by the one or more processors, cause the one or more processors to perform operations. The operations include obtaining a data matrix comprising multiple channels of LIDAR-associated data and inputting the data matrix comprising multiple channels of LIDAR-associated data into the machine-learned prediction model. The operations further include receiving, as output of the machine-learned prediction model, one or more class predictions for one or more different portions of the data matrix.

Another example aspect of the present disclosure is directed to an autonomous vehicle. The autonomous vehicle includes a sensor system and a vehicle computing system. The sensor system includes at least one LIDAR sensor configured to transmit ranging signals relative to the autonomous vehicle and to generate LIDAR data. The vehicle computing system includes one or more processors and at least one tangible, non-transitory computer readable medium that stores instructions that, when executed by the one or more processors, cause the one or more processors to perform operations. The operations include receiving LIDAR data from the sensor system and generating a data matrix comprising a plurality of data channels based at least in part on the LIDAR data, wherein one of the plurality of data channels within the data matrix comprises LIDAR Background Subtraction foreground data indicative of whether a LIDAR data point is a foreground LIDAR data point remaining after LIDAR Background Subtraction is applied to LIDAR data from the sensor system. The operations further include providing the data matrix comprising a plurality of data channels as input to a machine-learned model. The operations further include receiving, as output of the machine-learned model, a class prediction for each cell of the data matrix and receiving, as output of the machine-learned model, a properties estimation for each cell of the data matrix.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
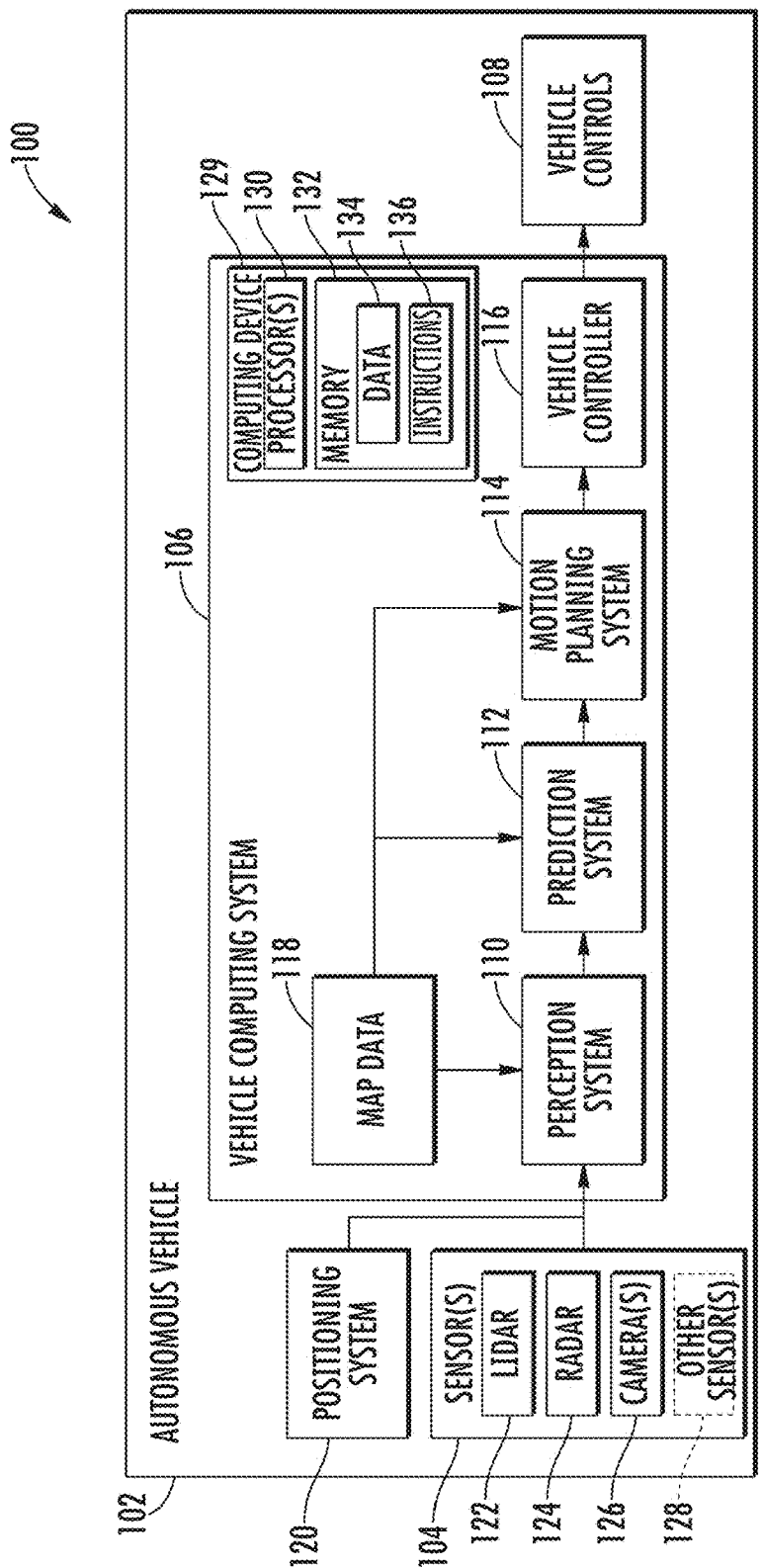
FIG. 1 depicts a block diagram of an example system for controlling the navigation of a vehicle according to example embodiments of the present disclosure.

Generally, the present disclosure is directed to detecting, classifying, and tracking objects, such as pedestrians, cyclists, other vehicles (whether stationary or moving), and the like, during the operation of an autonomous vehicle. In particular, in some embodiments of the present disclosure, an autonomous vehicle can include a perception system that implements an object detection system to detect potential objects of interest based at least in part on data provided from one or more sensor systems included in the autonomous vehicle. In some embodiments, the object detection system may use the data with a machine-learned model to facilitate the detection of potential objects of interest. In some embodiments, the machine-learned model may be a neural network and, for example, can be a type of feed-forward neural network such as a convolutional neural network. According to some embodiments of the present disclosure, the data input into the machine-learned model can include a multi-channel data matrix generated at least in part from sensor data (e.g., LIDAR data) provided by the sensor system. By using a multi-channel data matrix with a machine-learned model, an object detection system according to embodiments of the present disclosure can more accurately detect objects of interest and thereby improve the classification and tracking of such objects of interest in a perception system of an autonomous vehicle. As a result of such improved object detection, classification, and tracking, further analysis in autonomous vehicle applications is enhanced, such as those involving prediction, motion planning, and vehicle control, leading to improved passenger safety and vehicle efficiency.

More particularly, in some embodiments of the present disclosure, an autonomous vehicle can include one or more ranging systems as part of a sensor system, such as, for example, a Light Detection and Ranging (LIDAR) system and/or a Radio Detection and Ranging (RADAR) system. The one or more ranging systems can capture a variety of ranging data and provide it to a vehicle computing system, for example, for the detection, classification, and tracking of objects of interest during the operation of the autonomous vehicle. Additionally, in some embodiments, the object detection system can implement range-view LIDAR-based object detection. In particular, in some embodiments, range-view LIDAR-based object detection can include generating a multi-channel data matrix from the LIDAR data and possibly map data for the surrounding environment (or receiving such a multi-channel data matrix from other autonomous vehicle applications) and inputting the multi-channel data matrix into a machine-learned model, for example, a convolutional neural network, to produce machine-learned model outputs including object classification predictions and location/orientation predictions for use in a vehicle computing system of an autonomous vehicle, such as in perception, prediction, motion planning, and vehicle control.

In some embodiments, LIDAR sweep data can be generated from the LIDAR data provided by the sensor system. For example, in some embodiments, the LIDAR sweep data can be generated by a sweep builder to include an approximately 360 degree view of the LIDAR sensor data (e.g., including LIDAR data points received from an approximately 360 degree horizontal periphery around the autonomous vehicle). Such LIDAR sweep data can be used when generating a multi-channel data matrix.

According to a further aspect of the present disclosure, LIDAR Background Subtraction (LB S) can be applied to LIDAR data to subtract background LIDAR points so as to only produce output on the foreground LIDAR points. In some implementations, there is a greater likelihood of detecting objects of interest within foreground data points as opposed to background data points covering areas such as sky, background objects/structures, and the like. As such, foreground LIDAR data points obtained via LBS techniques can provide improvements to object detection (as well as planning and controlling the operation of an autonomous vehicle). Such use of LBS techniques can improve processing speed as well as overall performance of autonomous vehicle applications and systems.

In some embodiments, the LIDAR sweep data can be used in generating a multi-channel data matrix, for example a multi-channel polar data matrix, to be used as input to a machine-learned model, such as a feed-forward neural network or convolutional neural network. In particular, some embodiments of the present disclosure can include generating a five-channel data matrix based at least in part on the LIDAR sweep data. However, it should be recognized that a multi-channel data matrix, as contemplated in the present disclosure, is not limited to a five-channel data matrix. In other embodiments, a multi-channel data matrix may include a greater or smaller number of data channels, for example, a multi-channel data matrix may include two, three, four, five, or six data channels or more. In some embodiments, map data for the surrounding environment may also be used in generating the multi-channel data matrix. According to an aspect of the present disclosure, each cell in a multi-channel data matrix (e.g., in a five-channel data matrix) can contain at most one LIDAR point. In a case where more than one LIDAR point may fall on a cell of the multi-channel data matrix, the nearest LIDAR point can be selected for the cell because this LIDAR point may affect the vehicle behavior (e.g., vehicle motion planning) the most.

In particular, in some embodiments, five channels included in a multi-channel data matrix can include Range, Height, Intensity, Absence of LIDAR Return, and LBS Foreground. The Range channel can include indications of how far each LIDAR point is from the vehicle (or the LIDAR sensor). The Height channel can include indications of the height above the ground of each LIDAR point. The Intensity channel can include indications of how much energy is received back after a LIDAR beam hits an object (e.g., the energy intensity of the returned ranging signal). In some embodiments, an uncalibrated intensity may be used, while in other embodiments, a calibrated intensity may be used. The Absence of LIDAR Return channel can include an indication or flag of whether there is no LIDAR return for a cell, because not all of the cells in the data matrix may be populated (e.g., where a ranging signal is not reflected back to the sensor from an object). In some implementations, the LBS Foreground channel can include an indication or a flag of whether a LIDAR point is a foreground point remaining after LIDAR Background Subtraction is applied to LIDAR data (e.g., indicating that the machine-learned model should focus more on these points). In some implementations, the LBS Foreground channel can include a set of LIDAR data points having background LIDAR data points (e.g., data points determined as corresponding to background portions within an image) subtracted out so that only foreground LIDAR data points remain in the set.

In some embodiments, the multi-channel data matrix (e.g., a five-channel data matrix) can then be provided as input to a machine-learned model. In particular, in some embodiments, the multi-channel data matrix (e.g., five-channel data matrix) can be provided as input to a feed-forward or convolutional neural network. By providing a multi-channel data matrix including five different types of data as input to the convolutional neural network, the convolutional neural network can generate improved predictions of the class of an object and improved predictions/estimations of the object's location and orientation, and thereby improve object segmentation. In some embodiments, map data may additionally be provided as an input to assist in the object detection.

In some embodiments, the convolutional neural network can have a residual architecture. Additionally, in some embodiments, the convolutional neural network can include twenty (20) convolutional layers. Alternatively, in some embodiments, the convolutional neural network can include more than twenty convolutional layers, and in other embodiments, the convolutional neural network can include less than twenty convolutional layers. In some embodiments, a forward pass (e.g., inference time) in the convolutional neural network can take no more than 25 milliseconds, and in some implementations, a forward pass can take between 22 milliseconds and 25 milliseconds. In some embodiments, the machine-learned model can be unique with restrictions on the depth of the model (e.g., a limitation on the number of layers to reduce the inference time).

In some embodiments, the convolutional neural network can output at least two predictions on each cell of the multi-channel data matrix, a prediction of the class of the object at that LIDAR point and a prediction (or estimation) of properties of the object which may include, but not be restricted to, one or more of position, heading, size, velocity, and acceleration. In some embodiments, the prediction of the class of the LIDAR point can include a class probability. In some embodiments, the convolutional neural network can, additionally or alternatively, provide as an output a confidence score indicative of a determined likelihood that the predicted class of an object is correct. The prediction/estimation of the properties can include an instance center, an orientation, a width, and a height. In some embodiments, the properties prediction width and height can be predictions of the width and height of a box (or other polygon) in which the LIDAR point lies, for example. In some embodiments, the convolutional neural network may only output predictions on each cell of the multi-channel data matrix that is populated with a LIDAR point (e.g., where a ranging signal was reflected back to the sensor from an object).

In some embodiments, the outputs of the convolutional neural network can then be subjected to post-processing to create object segments and/or polygons, which can then be analyzed further in a perception system, such as for object classification and tracking, for example. In some embodiments, the post-processing can include one or more steps, and in some embodiments, can include three steps. For example, in a first step, the segmentation of the instances can be predicted based on the class probabilities and instance centers. In another step, a bounding box or other polygon for the instance can be estimated based on the instance center, the orientation, the height, and the width from the properties prediction/estimation. In a further step, non-maxima suppression can be applied, for example, to remove and/or reduce any overlapping bounding boxes. Alternatively, in some embodiments, the post-processing may not include all three steps, or may include additional post-processing steps. In some embodiments, the convolutional neural network and post-processing create two-dimensional (2D) bounding box outputs or three-dimensional (3D) bounding box outputs. Additionally, in some embodiments, measures of uncertainty, for example confidence scores, can also be provided as part of the machine-learned model outputs.

An autonomous vehicle can include a sensor system as described above as well as a vehicle computing system. The vehicle computing system can include one or more computing devices and one or more vehicle controls. The one or more computing devices can include a perception system, a prediction system, and a motion planning system that cooperate to perceive the surrounding environment of the autonomous vehicle and determine a motion plan for controlling the motion of the autonomous vehicle accordingly. The vehicle computing system can receive sensor data from the sensor system as described above and utilize such sensor data in the ultimate motion planning of the autonomous vehicle.

In particular, in some implementations, the perception system can receive sensor data from one or more sensors (e.g., one or more ranging systems and/or a plurality of cameras) that are coupled to or otherwise included within the sensor system of the autonomous vehicle. The sensor data can include information that describes the location (e.g., in three-dimensional space relative to the autonomous vehicle) of points that correspond to objects within the surrounding environment of the autonomous vehicle (e.g., at one or more times).

For example, an autonomous vehicle sensor system can be mounted on the roof of an autonomous vehicle and can include one or more ranging systems, for example a LIDAR system and/or a RADAR system. The one or more ranging systems can capture a variety of ranging data and provide it to a vehicle computing system, for example, for the detection, localization, classification, and tracking of objects of interest during the operation of the autonomous vehicle.

As one example, for a LIDAR system, the ranging data from the one or more ranging systems can include the location (e.g., in three-dimensional space relative to the LIDAR system) of a number of points (e.g., LIDAR points) that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the ranging data from the one or more ranging systems can include the location (e.g., in three-dimensional space relative to the RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

The perception system can identify one or more objects that are proximate to the autonomous vehicle based on sensor data received from the one or more sensors. In particular, in some implementations, the perception system can determine, for each object, state data that describes a current state of such object. As examples, the state data for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle versus pedestrian versus bicycle versus other); yaw rate; and/or other state information. In some implementations, the perception system can determine state data for each object over a number of iterations. In particular, the perception system can update the state data for each object at each iteration. Thus, the perception system can detect and track objects (e.g., vehicles, bicycles, pedestrians, etc.) that are proximate to the autonomous vehicle over time, and thereby produce a presentation of the world around an autonomous vehicle along with its state (e.g., a presentation of the objects of interest within a scene at the current time along with the states of the objects).

The prediction system can receive the state data from the perception system and predict one or more future locations for each object based on such state data. For example, the prediction system can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system can determine a motion plan for the autonomous vehicle based at least in part on predicted one or more future locations for the object and/or the state data for the object provided by the perception system. Stated differently, given information about the current locations of objects and/or predicted future locations of proximate objects, the motion planning system can determine a motion plan for the autonomous vehicle that best navigates the autonomous vehicle along the determined travel route relative to the objects at such locations.

As one example, in some implementations, the motion planning system can determine a cost function for each of one or more candidate motion plans for the autonomous vehicle based at least in part on the current locations and/or predicted future locations of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the current locations and/or predicted future locations of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller that controls one or more vehicle controls (e.g., actuators or other devices that control gas flow, steering, braking, etc.) to execute the selected motion plan.

The systems and methods described herein may provide a number of technical effects and benefits. By using a multi-channel data matrix with a machine-learned model as described herein, an object detection system according to embodiments of the present disclosure can provide a technical effect and benefit of more accurately detecting objects of interest and thereby improving the classification and tracking of such objects of interest in a perception system of an autonomous vehicle. For example, performing more accurate segmentation provides for improved tracking by having cleaner segmented objects and provides for improved classification once objects are properly segmented. Such improved object detection accuracy can be particularly advantageous for use in conjunction with vehicle computing systems for autonomous vehicles. Because vehicle computing systems for autonomous vehicles are tasked with repeatedly detecting and analyzing objects in sensor data for tracking and classification of objects of interest (including other vehicles, cyclists, pedestrians, traffic control devices, and the like) and then determining necessary responses to such objects of interest, improved object detection accuracy allows for faster and more accurate object tracking and classification. Improved object tracking and classification can have a direct effect on the provision of safer and smoother automated control of vehicle systems and improved overall performance of autonomous vehicles.

The systems and methods described herein may also provide a technical effect and benefit of improving object segmentation in cases where smaller objects are close to larger objects. Prior segmentation approaches often have difficulty distinguishing smaller instances from larger instances when the instances are close to each other, for example, resulting in a segmentation error where the smaller instance is segmented in as part of the larger instance. In one example, a segmentation error may result in merging a pedestrian into a vehicle that is close by the pedestrian. In such a situation, autonomous vehicle motion planning may determine a vehicle trajectory that does not include as wide a berth as generally preferred when passing a pedestrian. A smaller marginal passing distance may be acceptable when navigating an autonomous vehicle past another vehicle, but a larger marginal passing distance may be preferred when navigating the autonomous vehicle past a pedestrian. The improved object detection systems and methods as described herein provide for improved segmentation whereby smaller instances (e.g., objects such as pedestrians) are not merged with larger instances (e.g., objects such as vehicles) that are nearby.

The systems and methods described herein may also provide resulting improvements to computing technology tasked with object detection, tracking, and classification. The systems and methods described herein may provide improvements in the speed and accuracy of object detection and classification, resulting in improved operational speed and reduced processing requirements for vehicle computing systems, and ultimately more efficient vehicle control.

With reference to the figures, example embodiments of the present disclosure will be discussed in further detail. FIG. 1 depicts a block diagram of an example system 100 for controlling the navigation of an autonomous vehicle 102 according to example embodiments of the present disclosure. The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 102 can include one or more sensors 104, a vehicle computing system 106, and one or more vehicle controls 108. The vehicle computing system 106 can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path.

The vehicle computing system 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations. In some implementations, the one or more processors 130 and at least one memory 132 may be comprised in one or more computing devices, such as computing device(s) 129, within the vehicle computing system 106.

In some implementations, vehicle computing system 106 can further be connected to, or include, a positioning system 120. Positioning system 120 can determine a current geographic location of the autonomous vehicle 102. The positioning system 120 can be any device or circuitry for analyzing the position of the autonomous vehicle 102. For example, the positioning system 120 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position. The position of the autonomous vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system 122, a Radio Detection and Ranging (RADAR) system 124, one or more cameras 126 (e.g., visible spectrum cameras, infrared cameras, etc.), and/or other sensors 128. The sensor data can include information that describes the location of objects within the surrounding environment of the autonomous vehicle 102.

As one example, for LIDAR system 122, the sensor data can include the location (e.g., in three-dimensional space relative to the LIDAR system 122) of a number of points that correspond to objects that have reflected a ranging laser. For example, LIDAR system 122 can measure distances by measuring the Time of Flight (TOF) that it takes a short laser pulse to travel from the sensor to an object and back, calculating the distance from the known speed of light.

As another example, for RADAR system 124, the sensor data can include the location (e.g., in three-dimensional space relative to RADAR system 124) of a number of points that correspond to objects that have reflected a ranging radio wave. For example, radio waves (pulsed or continuous) transmitted by the RADAR system 124 can reflect off an object and return to a receiver of the RADAR system 124, giving information about the object's location and speed. Thus, RADAR system 124 can provide useful information about the current speed of an object.

As yet another example, for one or more cameras 126, various processing techniques (e.g., range imaging techniques such as, for example, structure from motion, structured light, stereo triangulation, and/or other techniques) can be performed to identify the location (e.g., in three-dimensional space relative to the one or more cameras 126) of a number of points that correspond to objects that are depicted in imagery captured by the one or more cameras 126. Other sensor systems 128 can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116 that controls one or more vehicle controls 108 (e.g., actuators or other devices that control gas flow, acceleration, steering, braking, etc.) to execute the selected motion plan.

Each of the perception system 110, the prediction system 112, the motion planning system 114, and the vehicle controller 116 can include computer logic utilized to provide desired functionality. In some implementations, each of the perception system 110, the prediction system 112, the motion planning system 114, and the vehicle controller 116 can be implemented in hardware, firmware, and/or software controlling a general purpose processor. For example, in some implementations, each of the perception system 110, the prediction system 112, the motion planning system 114, and the vehicle controller 116 includes program files stored on a storage device, loaded into a memory, and executed by one or more processors. In other implementations, each of the perception system 110, the prediction system 112, the motion planning system 114, and the vehicle controller 116 includes one or more sets of computer-executable instructions that are stored in a tangible computer-readable storage medium such as RAM hard disk or optical or magnetic media.

Figure 2:
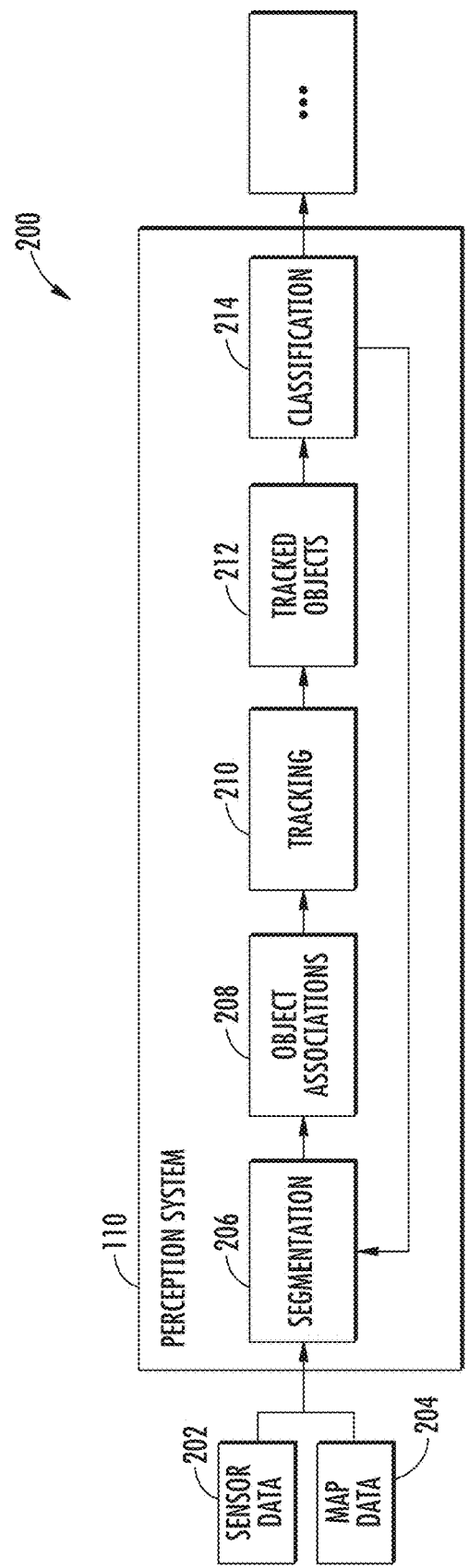
FIG. 2 depicts a block diagram of an example perception system according to example embodiments of the present disclosure.

FIG. 2 depicts a block diagram of an example perception system 200 according to example embodiments of the present disclosure. As discussed in regard to FIG. 1, a vehicle computing system 106 can include a perception system 110 that can identify one or more objects that are proximate to an autonomous vehicle 102. In some embodiments, the perception system 110 can include segmentation component 206, object associations component 208, tracking component 210, tracked objects component 212, and classification component 214. The perception system 110 can receive sensor data 202 (e.g., from one or more sensor(s) 104 of the autonomous vehicle 102) and map data 204 as input. The perception system 110 can use the sensor data 202 and the map data 204 in determining objects within the surrounding environment of the autonomous vehicle 102. In some embodiments, the perception system 110 iteratively processes the sensor data 202 to detect, track, and classify objects identified within the sensor data 202. In some examples, the map data 204 can help localize the sensor data to positional locations within a map data or other reference system.

Within the perception system 110, the segmentation component 206 can process the received sensor data 202 and map data 204 to determine potential objects within the surrounding environment, for example using one or more object detection systems. The object associations component 208 can receive data about the determined objects and analyze prior object instance data to determine a most likely association of each determined object with a prior object instance, or in some cases, determine if the potential object is a new object instance. The tracking component 210 can determine the current state of each object instance, for example, in terms of its current position, velocity, acceleration, heading, orientation, uncertainties, and/or the like. The tracked objects component 212 can receive data regarding the object instances and their associated state data and determine object instances to be tracked by the perception system 110. The classification component 214 can receive the data from tracked objects component 212 and classify each of the object instances. For example, classification component 212 can classify a tracked object as an object from a predetermined set of objects (e.g., a vehicle, bicycle, pedestrian, etc.). The perception system 110 can provide the object and state data for use by various other systems within the vehicle computing system 106, such as the prediction system 112 of FIG. 1.

Figure 3:
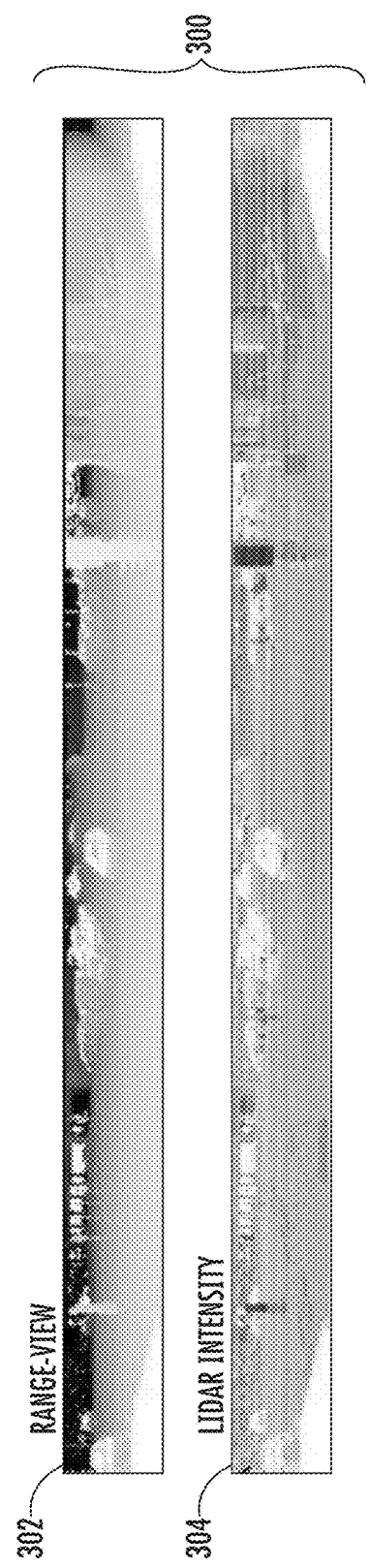
FIG. 3 depicts an example of LIDAR sensor data according to example embodiments of the present disclosure.

FIG. 3 depicts an example of LIDAR sensor data 300 according to example embodiments of the present disclosure. In particular, FIG. 3 provides graphical depictions of LIDAR sensor data 300 collected by a LIDAR system, such as LIDAR system 122, of an autonomous vehicle. The LIDAR sensor data 300 can provide a variety of ranging data for use in object detection, classification, and/or tracking, such as LIDAR range data 302 and LIDAR intensity data 304. In some embodiments, sensor data collected by the LIDAR system 122 can be used to generate LIDAR sweep data, for example by a sweep builder, which provides a view of the surrounding environment of an autonomous vehicle. In some embodiments, such LIDAR sweep data can be generated by a sweep builder to include an approximately 360 degree view of the LIDAR sensor data 300 from the surrounding environment of the autonomous vehicle.

As an example, the LIDAR sensor data 300 can include LIDAR range data 302 which indicates how far away an object is from the LIDAR system 122 (e.g., the distance to an object struck by a ranging laser beam from the LIDAR system 122). The LIDAR range data 302, as illustrated in FIG. 3, depicts LIDAR points generated from a plurality of ranging laser beams being reflected from objects, with each row of the LIDAR range data 302 depicting points generated by each ranging laser beam. In FIG. 3, the LIDAR points in LIDAR range data 302 are depicted using a colorized gray level to indicate the range of the LIDAR data points from the LIDAR system 122, with darker points being at a greater distance or range. As another example, the LIDAR sensor data 300 can also include LIDAR intensity data 304 which indicates how much energy or power is returned to the LIDAR system 122 by the ranging laser beams being reflected from an object. Similar to the LIDAR range data 302, each row of the LIDAR intensity data 304 depicts the returned intensity for each ranging laser beam.

Figure 4:
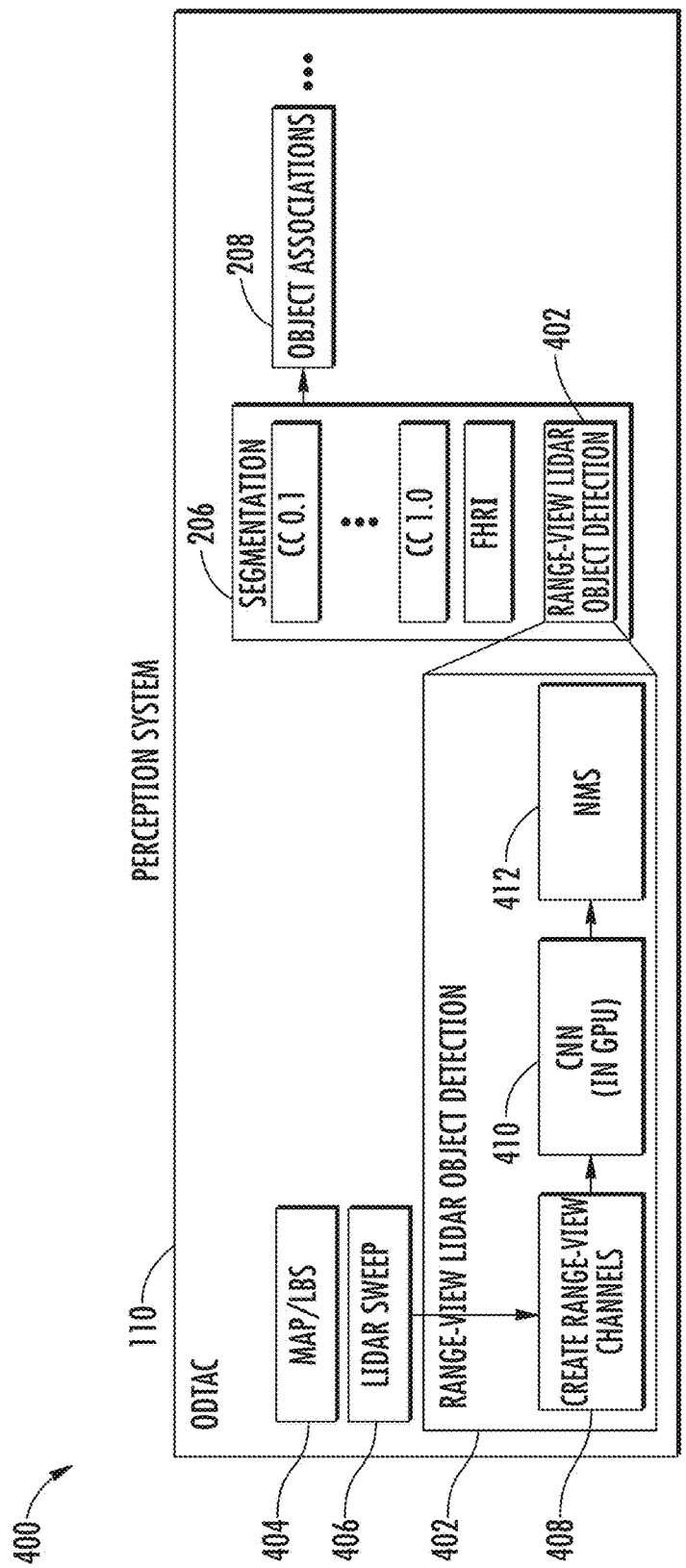
FIG. 4 depicts a block diagram of an example object detection system according to example embodiments of the present disclosure.

FIG. 4 depicts a block diagram of an example object detection system 400 in a perception system of an autonomous vehicle according to example embodiments of the present disclosure. In particular, FIG. 4 illustrates an example embodiment of a range-view LIDAR object detection system 402 which provides object detection in a segmentation component (e.g., segmentation component 206 of FIG. 2) of a perception system (e.g. perception system 110 of FIG. 1). As discussed in regard to FIG. 2, the perception system 110 can include a plurality of systems for detecting, classifying, and/or tracking one or more objects, including a segmentation component 206. In some embodiments, the segmentation component 206 can implement one or more object detection systems to detect potential objects of interest based at least in part on data (e.g., LIDAR sensor data, etc.) provided from one or more sensor systems included in the autonomous vehicle. For example, in some embodiments, a LIDAR system of a sensor system (e.g., sensor(s) 104 of FIG. 1) of an autonomous vehicle can generate LIDAR sensor data and provide the LIDAR sensor data to a vehicle computing system of the autonomous vehicle (e.g., vehicle computing system 106 of FIG. 1).

As discussed above, the perception system 110 can receive sensor data and map data (e.g., sensor data 202 and map data 204 of FIG. 2) for use in detecting, classifying, and/or tracking objects within the surrounding environment of an autonomous vehicle (e.g., autonomous vehicle 102 of FIG. 1). In some embodiments, the sensor data can include LIDAR sensor data and the perception system 110 can apply LIDAR Background Subtraction (LBS) to the LIDAR sensor data. In applying LBS, background LIDAR points can be subtracted from the LIDAR sensor data so as to only produce output on the foreground LIDAR points. For example, in some implementations, there would be a greater likelihood of detecting objects of interest within foreground data points as opposed to background data points covering areas such as sky, background objects, background structures, and the like. In some embodiments, the perception system 110 (or another system within vehicle computing system 106 of FIG. 1) can generate LIDAR sweep data based on the LIDAR sensor data. For example, in some embodiments, the LIDAR sweep data can be generated by a sweep builder. In some embodiments, the LIDAR sweep data can include an approximately 360 degree view of the LIDAR sensor data (e.g., including LIDAR data points received from an approximately 360 degree horizontal periphery around the autonomous vehicle).

As illustrated in FIG. 4, the segmentation component 206 can include a range-view LIDAR object detection system 402 to detect potential objects of interest based at least in part on LIDAR sensor data. In some embodiments, the range-view LIDAR object detection system 402 can include one or more range-view data channels 408, a machine-learned model 410, and a post-processing component 412.

Data provided to the components of FIG. 4 can include MAP/LBS data 404 and LIDAR sweep data 406. MAP/LBS data 404 can include, for example, map data 204 that can be used for localizing the position of objects detected by sensor data 202 (e.g., LIDAR sensor data from LIDAR system 122 of FIG. 1) and an LBS filter for selective application on one or more portions of LIDAR sweep data 406. LIDAR sweep data 406 can correspond to an approximately 360 degree field of view of the LIDAR sensor data 300 generated from LIDAR system 122. The range-view LIDAR object detection system 402 can receive the LIDAR sweep data 406 and the MAP/LBS data 404 for use in object detection.

Figure 5:
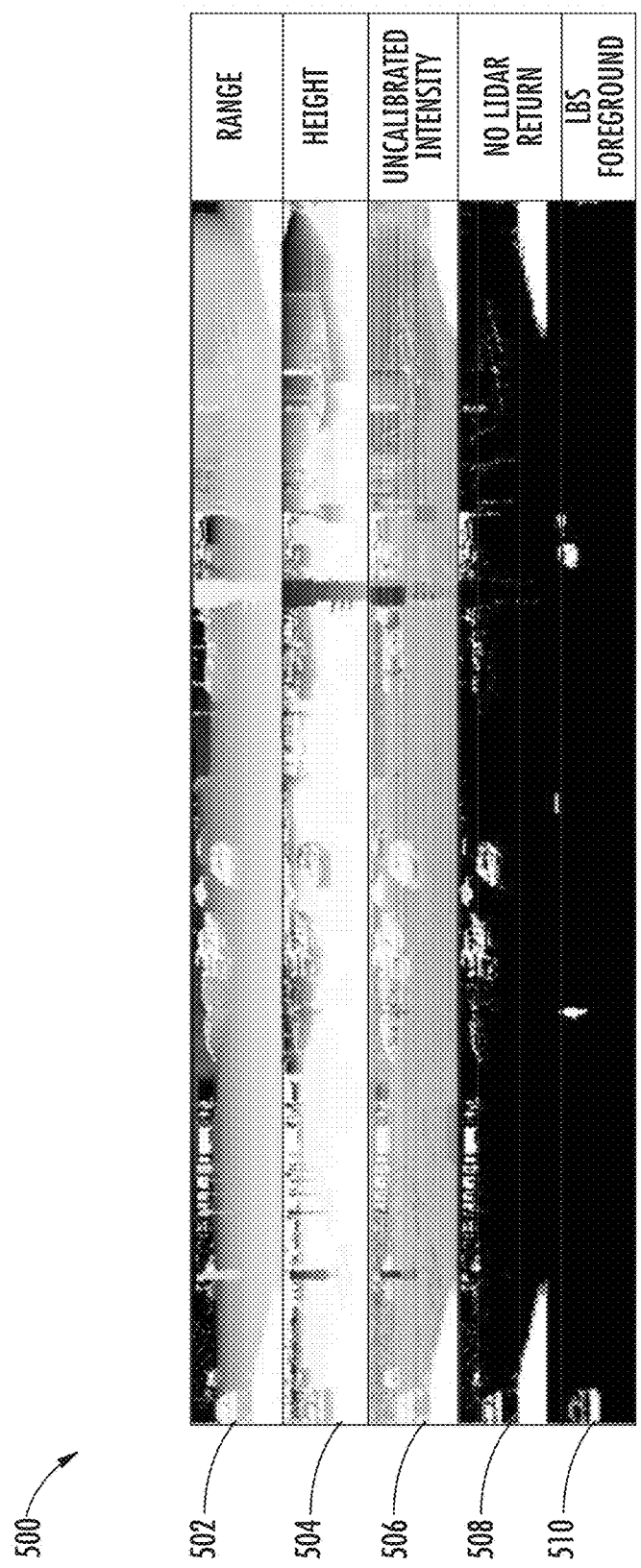
FIG. 5 illustrates an example data matrix for range-view object detection according to example embodiments of the present disclosure.

In some embodiments, the range-view LIDAR object detection system 402 can use the LIDAR sweep data 406 and MAP/LBS data 404 in creating one or more range-view data channels 408, for example generating a multi-channel data matrix, such as a polar data matrix, from the LIDAR data (discussed in further detail with regard to FIG. 5). The range-view LIDAR object detection system 402 can input the one or more range-view data channels 408 (e.g., a multi-channel data matrix) into a machine-learned model 410, such as a neural network or convolutional neural network. The machine-learned model 410 can produce one or more model outputs, such as class predictions and location estimations for each cell of the multi-channel data matrix (e.g., pixel-wise class predictions and location estimations).

In some embodiments, the range-view LIDAR object detection system 402 can provide the one or more model outputs (e.g., class predictions and properties estimations for cells of the data matrix) to a post-processing component 410 that can generate segmented object candidates (e.g., object segments and/or polygons). The segmented object candidates can include, for example, a bounding box or other bounding shape for each object instance. In some embodiments, the post-processing component 412 can include a plurality of processes, and for example, can include one or more of three processes. In some examples, the post-processing component 412 can predict the segmentation of object instances based on the class probabilities and instance centers. The post-processing component 412 can then estimate a bounding box for each object instance based on the instance center, the orientation, the height, and the width from the properties estimation. In some examples, the post-processing component 412 can include applying non-maxima suppression (NMS) to remove and/or reduce any overlapping bounding boxes determined for the segmented object candidates. Alternatively, in some embodiments, the post-processing component 412 may include alternate or additional post-processing steps.

The range-view LIDAR object detection system 402 can provide the object segment candidates (e.g., object segments and/or polygons) to the segmentation component 206 such that selected segmented object candidates can be provided to one or more other components implemented in the perception system 110, such as the object associations component 208, for use in tracking and/or classifying objects of interest.

In some embodiments, for example when a plurality of object detection systems are implemented in segmentation component 206, the segmentation component 206 can include a segment selector which receives segmented object candidates from the plurality of object detection systems and determines the most likely segmented object candidates to be provided to other components within the perception system 110 for tracking and classification of the objects.

FIG. 5 illustrates an example data matrix 500 for range-view LIDAR object detection according to example embodiments of the present disclosure. In particular, FIG. 5 depicts examples of range-view channels that may be generated by a range-view LIDAR object detection system (such as range-view LIDAR object detection system 402 of FIG. 4) based at least in part on LIDAR sensor data received from a LIDAR system (such as LIDAR system 122 of FIG. 1) of an autonomous vehicle. For example, in some embodiments, LIDAR sweep data can be used in generating one or more range-view channels for use as input to a machine-learned model as part of the range-view LIDAR object detection system (e.g., range-view LIDAR object detection system 402). In some embodiments, map data for the surrounding environment may also be used in generating the one or more range-view channels. In some embodiments, the range-view channels can be implemented by generating a multi-channel data matrix, for example, a multi-channel polar data matrix, based at least in part on the LIDAR sensor data. In some embodiments, each cell in such a multi-channel data matrix can contain at most one LIDAR point. In a case where more than one LIDAR point may fall on a cell of the multi-channel data matrix, the nearest LIDAR point can be selected for the cell because this LIDAR point may affect the vehicle behavior (e.g., vehicle motion planning) the most. In some embodiments, map data for the surrounding environment may also be used in generating the multi-channel data matrix.

In the example embodiment illustrated in FIG. 5, the multi-channel data matrix 500 includes five range-view channels based, at least in part, on the LIDAR sensor data. In particular, in some embodiments, the five channels can include Range channel 502, Height channel 504, Intensity channel 506, Absence of LIDAR Return channel 508, and LBS Foreground channel 510. A Range channel 502 can include indications of how far each LIDAR point is from the vehicle (or the LIDAR sensor). A Height channel 504 can include indications of the height above the ground of each LIDAR point. An Intensity channel 506 can include indications of how much energy is received back after a LIDAR beam hits an object (e.g., the energy intensity of the returned ranging signal). In some embodiments, an uncalibrated intensity may be used, while in other embodiments, a calibrated intensity may be used for the Intensity channel 506. The Absence of LIDAR Return channel 508 can include an indication or flag of whether there is no LIDAR return in a cell, because, for example, not all of the cells in the data matrix may be populated (e.g., where a ranging signal is not reflected back to the sensor from an object). In some implementations, the LBS Foreground channel 510 can include an indication or a flag of whether a LIDAR point is a foreground point remaining after LIDAR Background Subtraction is applied to LIDAR data (e.g., indicating that the machine-learned model should focus more on these points). In some implementations, the LBS Foreground channel 510 can include a set of LIDAR data points having background LIDAR data points (e.g., data points determined as corresponding to background portions within an image) subtracted out so that only foreground LIDAR data points remain in the set.

While FIG. 5 illustrates an example five-channel data matrix 500 generated based on LIDAR data, it should be recognized that a multi-channel data matrix in accordance with the present disclosure is not limited to a five-channel data matrix. In other embodiments, a multi-channel data matrix may include a greater or smaller number of data channels, for example, a multi-channel data matrix may include two, three, four, five, or six data channels or more.

Figure 6:
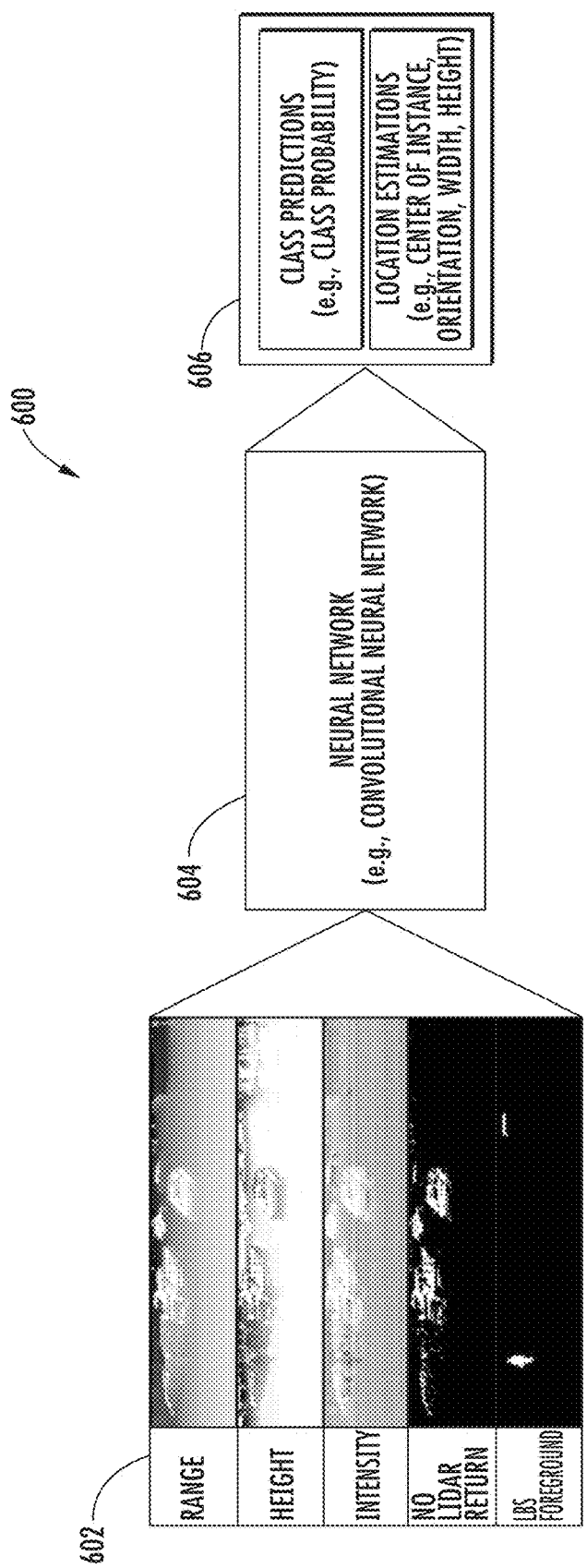
FIG. 6 illustrates an example machine learned model for range-view object detection according to example embodiments of the present disclosure.

FIG. 6 illustrates an example machine learned model for range-view object detection according to example embodiments of the present disclosure. In particular, in some embodiments, the range-view LIDAR object detection system 600 depicted in FIG. 6 can include features for use in range-view LIDAR object detection system 402 such as depicted in FIG. 4. Range-view LIDAR object detection system 600 may use range-view data channels as input for a machine-learned model to facilitate the detection of potential objects of interest. For example, the range-view LIDAR object detection system 600 can provide a multi-channel data matrix 602 as input for a machine-learned model 604. The multi-channel data matrix 602 may correspond, for example to a five-channel data matrix such as data matrix 500 of FIG. 5 or the multi-channel data matrix 602 may include a greater or smaller number of data channels.

In some embodiments, the machine-learned model 604 may be a neural network and, for example, can be a type of feed-forward neural network such as a convolutional neural network. The machine-learned model 604 (e.g., convolutional neural network or other neural network) can produce machine-learned model outputs 606, for example, object classification predictions and location/orientation predictions, based on the multi-channel data matrix input. The machine-learned model outputs 606 (e.g., object classification predictions and location/orientation predictions) can then be used by the range-view LIDAR object detection system 600 to generate segmented object candidates for use by components implemented in perception system 110, for example. In some embodiments, the machine-learned model outputs 606 (e.g., convolutional neural network outputs) can be subjected to post-processing to create object segments and/or polygons, which can then be analyzed further in perception system 110, such as for object tracking and classification, for example.

In some embodiments, for example when the machine-learned model 604 is implemented as a convolutional neural network, such a convolutional neural network can have a residual architecture. Additionally, in some embodiments, such a convolutional neural network can include twenty convolutional layers. Alternatively, in some embodiments, a convolutional neural network can include more or less convolutional layers. Additionally, in some embodiments, the convolutional neural network can be configured such that a forward pass (e.g., the inference time) in the convolutional neural network can take no more than 25 milliseconds, and in some implementations, a forward pass can take between 22 milliseconds and 25 milliseconds.

Figure 7:
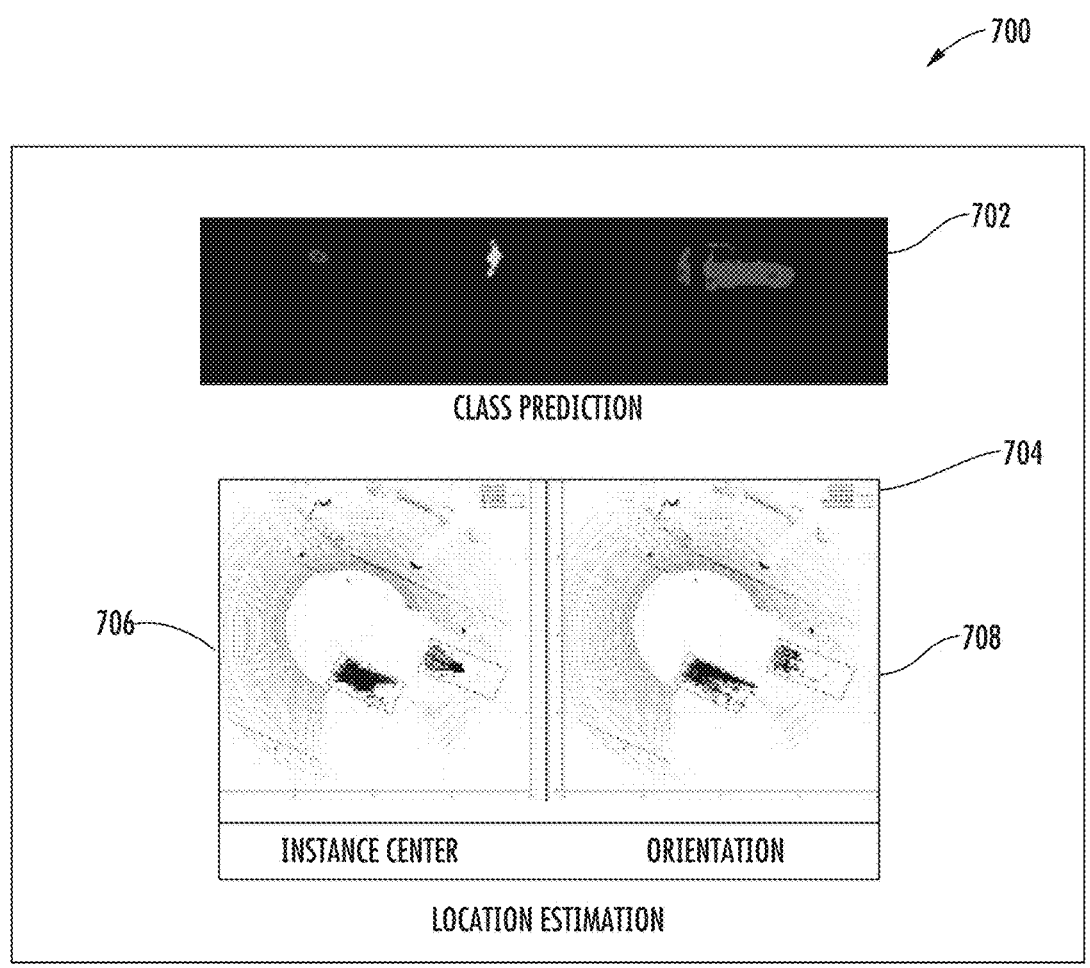
FIG. 7 illustrates example machine learned model outputs according to example embodiments of the present disclosure.

FIG. 7 illustrates example machine-learned model outputs according to example embodiments of the present disclosure. In particular, FIG. 7 illustrates example machine-learned model outputs 700 that can be produced by a convolutional neural network using a multi-channel data matrix (e.g., data matrix 500 of FIG. 5) as input. In some embodiments, the machine-learned model outputs 700 can include a plurality of predictions on each cell of the multi-channel data matrix. For example, in some embodiments, the machine-learned model outputs 700 (e.g., outputs of machine-learned model 604 of FIG. 6) can include at least two predictions on each cell of the multi-channel data matrix: a class prediction 702 for the object at that LIDAR point and a location estimation 704 of that LIDAR point. In some embodiments, the class prediction 702 for the LIDAR point can correspond to a prediction for the class of an object at a LIDAR point as an object from a predetermined set of classes (e.g., a vehicle, bicycle, pedestrian, etc.). In some implementations, class prediction 702 can also include a class probability. In some embodiments, the machine-learned model (e.g., convolutional neural network) can, additionally or alternatively, provide as an output a confidence score indicative of a determined likelihood that class prediction 702 of an object is correct. In some embodiments, the location estimation 704 can include an instance center 706, an orientation 708, as well as a width and a height (not illustrated). In some embodiments, the width and height associated with location estimation 704 can be predictions of the width and height of a box (or other polygon) in which the LIDAR point lies, for example. In some implementations, the location estimation 704 can comprise predictions/estimations of one or more properties of the object such as one or more of position, heading, size, velocity, and acceleration.

Improved predictions of the class of an object (e.g., via class prediction 702) and improved predictions/estimations of the object's location and orientation (e.g., via location estimation 704) can be realized in part by providing a multi-channel data matrix including different types of LIDAR data as input to a machine-learned model, thereby improving object segmentation and other applications related to object detection, tracking and/or classification.

Figure 8:
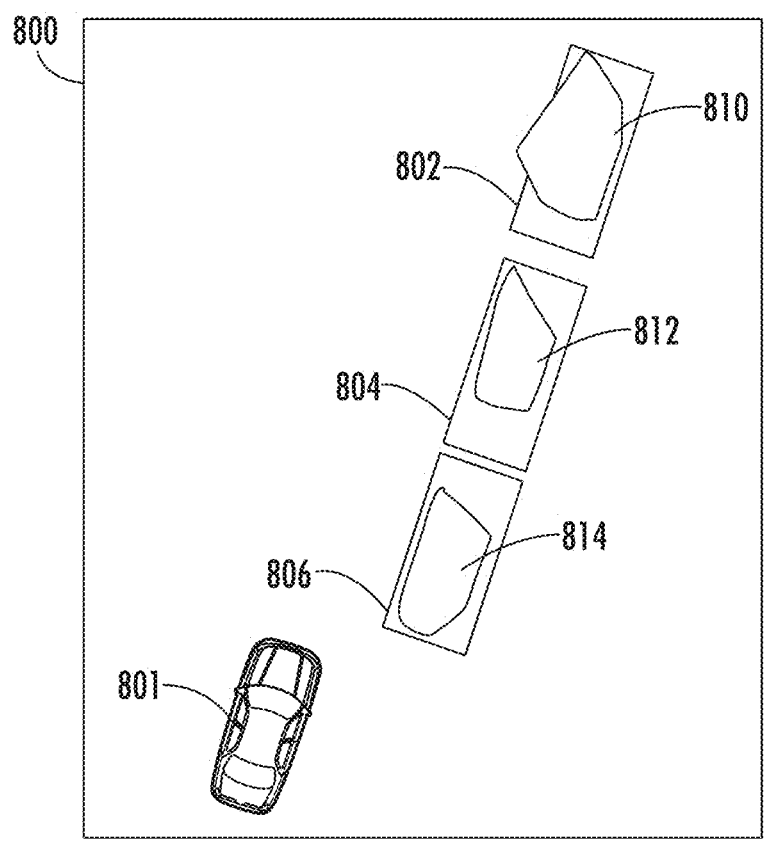
FIG. 8 illustrates example range-view object detection outputs according to example embodiments of the present disclosure.

FIG. 8 illustrates example object detection outputs according to example embodiments of the present disclosure. In particular, FIG. 8 depicts an illustration of a partial view of the surrounding environment 800 of an autonomous vehicle 801. In some embodiments, as the autonomous vehicle 801 travels, the sensor system of the autonomous vehicle 801 generates sensor data, such as LIDAR sensor data, regarding objects in the surrounding environment. As discussed herein, in some embodiments, the vehicle computing system, and more particularly, the perception system implemented in the vehicle computing system, analyzes the sensor data, including the LIDAR sensor data, to detect one or more objects in the surrounding environment. More particularly, FIG. 8 illustrates some example object detection outputs according to some example embodiments of the present disclosure. For example, the partial view of the surrounding environment 800 includes three objects (e.g., vehicles) identified by object detection systems implemented in the perception system. In the example embodiment, a range-view LIDAR object detection system predicted three object instances (e.g., vehicles), as depicted by bounding box 802, bounding box 804, and bounding box 806, according to embodiments herein. Additionally, one or more other object detection systems implemented in the perception system (e.g., implemented in the segmentation component 206 of FIG. 4) may have predicted three alternate object instances, as depicted by object 810, object 812, and object 814. As illustrated in FIG. 8, bounding box 802, bounding box 804, and bounding box 806 predicted by the range-view LIDAR object detection system provide improved segmentations, which can thereby allow for improved object tracking and/or classification by the perception system.

Further, as illustrated by bounding box 802 in comparison to object 810, the range-view LIDAR object detection system as disclosed herein may reduce segmentation errors in cases where smaller objects are positioned close to larger objects. As shown in FIG. 8, object 810 may include LIDAR points that belong to another smaller object (e.g., a pedestrian) that is located close to the left side of the object 810. However, bounding box 802, output by the range-view LIDAR object detection system in the example embodiment, only includes the LIDAR points that belong to the detected object (e.g., vehicle) in the segmented object instance.

Figure 9:
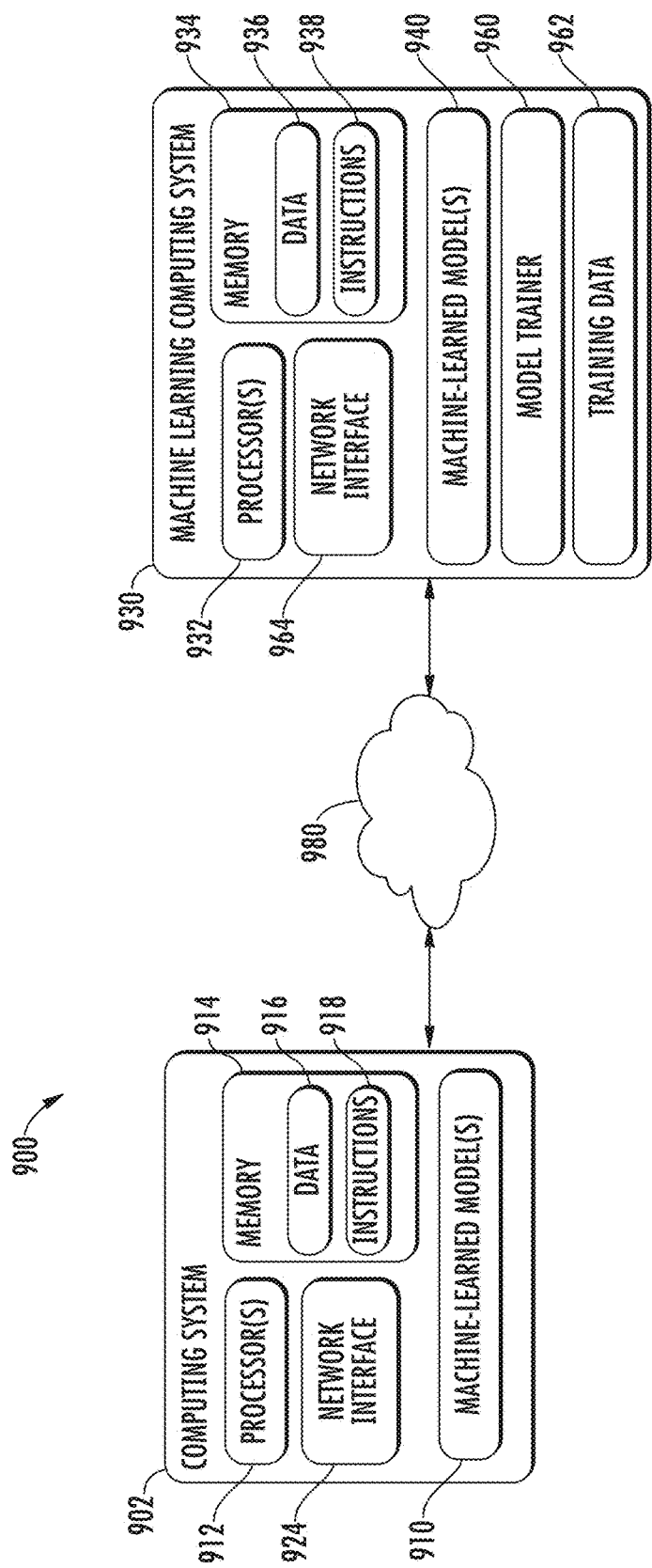
FIG. 9 depicts a block diagram of an example computing system according to example embodiments of the present disclosure.

FIG. 9 depicts a block diagram of an example computing system 900 according to example embodiments of the present disclosure. The example system 900 includes a computing system 902 and a machine learning computing system 930 that are communicatively coupled over a network 980.

In some implementations, the computing system 902 can perform autonomous vehicle motion planning including object detection, tracking, and/or classification (e.g., making object class predictions and object location/orientation estimations as described herein). In some implementations, the computing system 902 can be included in an autonomous vehicle. For example, the computing system 902 can be on-board the autonomous vehicle. In other implementations, the computing system 902 is not located on-board the autonomous vehicle. For example, the computing system 902 can operate offline to perform object detection including making object class predictions and object location/orientation estimations. The computing system 902 can include one or more distinct physical computing devices.

The computing system 902 includes one or more processors 912 and a memory 914. The one or more processors 912 can be any suitable processing device (e.g., a processor core, a microprocessor, an ASIC, a FPGA, a controller, a microcontroller, etc.) and can be one processor or a plurality of processors that are operatively connected. The memory 914 can include one or more non-transitory computer-readable storage media, such as RAM, ROM, EEPROM, EPROM, one or more memory devices, flash memory devices, etc., and combinations thereof.

The memory 914 can store information that can be accessed by the one or more processors 912. For instance, the memory 914 (e.g., one or more non-transitory computer-readable storage mediums, memory devices) can store data 916 that can be obtained, received, accessed, written, manipulated, created, and/or stored. The data 916 can include, for instance, ranging data obtained by LIDAR system 122 and/or RADAR system 124, image data obtained by camera(s) 126, data identifying detected and/or classified objects including current object states and predicted object locations and/or trajectories, motion plans, machine-learned models, rules, etc. as described herein. In some implementations, the computing system 902 can obtain data from one or more memory device(s) that are remote from the system 902.

The memory 914 can also store computer-readable instructions 918 that can be executed by the one or more processors 912. The instructions 918 can be software written in any suitable programming language or can be implemented in hardware. Additionally, or alternatively, the instructions 918 can be executed in logically and/or virtually separate threads on processor(s) 912.

Figure 10:
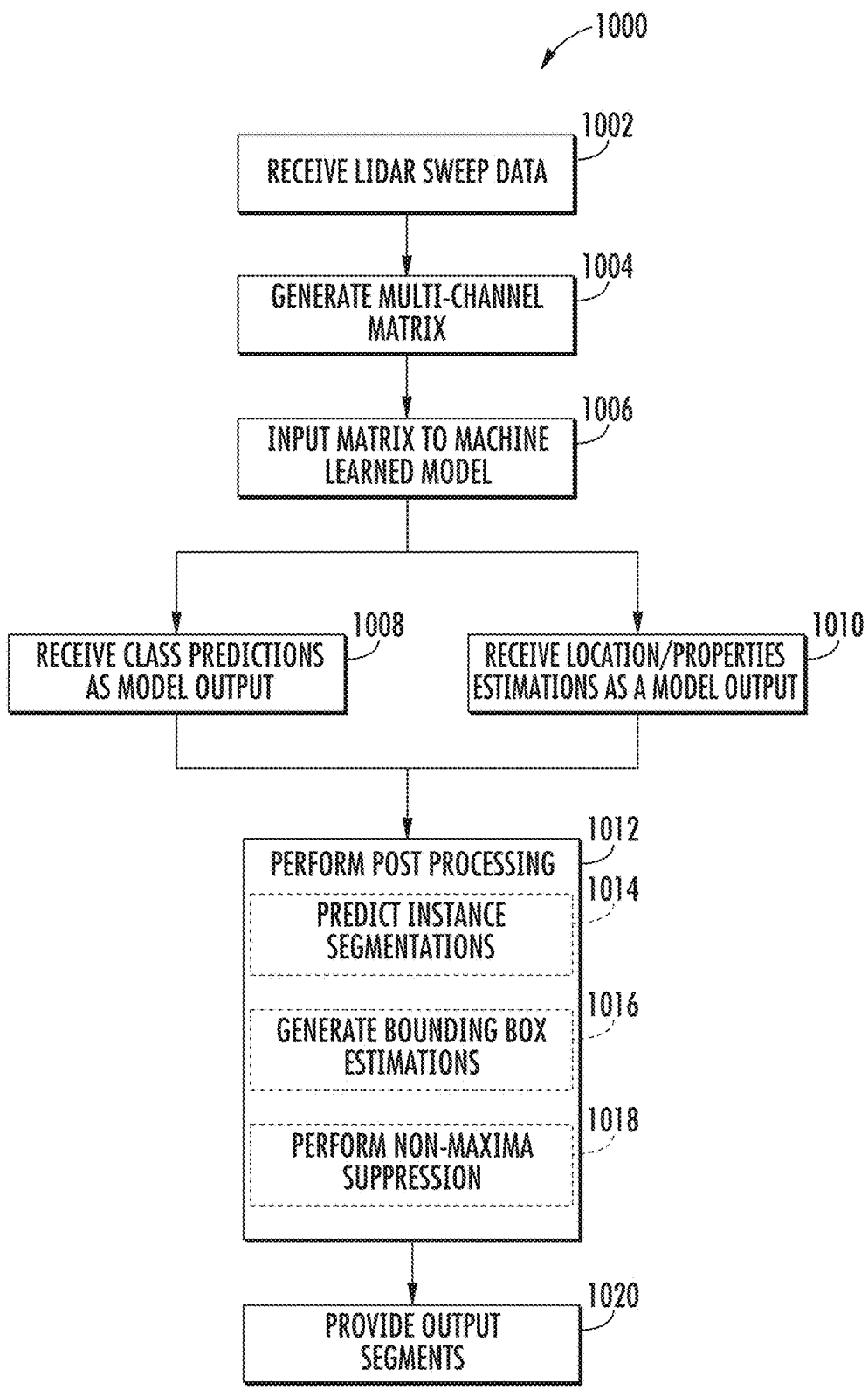
FIG. 10 depicts a flowchart diagram of an example method of range-view object detection according to example embodiments of the present disclosure.

For example, the memory 914 can store instructions 918 that when executed by the one or more processors 912 cause the one or more processors 912 to perform any of the operations and/or functions described herein, including, for example, operations 1002-1020 of FIG. 10.

According to an aspect of the present disclosure, the computing system 902 can store or include one or more machine-learned models 910. As examples, the machine-learned models 910 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

In some implementations, the computing system 902 can receive the one or more machine-learned models 910 from the machine learning computing system 930 over network 980 and can store the one or more machine-learned models 910 in the memory 914. The computing system 902 can then use or otherwise implement the one or more machine-learned models 910 (e.g., by processor(s) 912). In particular, the computing system 902 can implement the machine learned model(s) 910 to perform object detection including making object class predictions and object location/orientation estimations. For example, in some implementations, the computing system 902 can employ the machine-learned model(s) 910 by inputting a multi-channel data matrix (e.g., data matrix 500 of FIG. 5) into the machine-learned model(s) 910 and receiving a prediction of the class of a LIDAR point at a cell of the data matrix (e.g., class prediction 702 of FIG. 7) and a prediction (or estimation) of one or more properties of an object at that LIDAR point (e.g., location estimation 704 of FIG. 7) as an output of the machine-learned model(s) 910.

The machine learning computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage media, such as RAM, ROM, EEPROM, EPROM, one or more memory devices, flash memory devices, etc., and combinations thereof.

The memory 934 can store information that can be accessed by the one or more processors 932. For instance, the memory 934 (e.g., one or more non-transitory computer-readable storage mediums, memory devices) can store data 936 that can be obtained, received, accessed, written, manipulated, created, and/or stored. The data 936 can include, for instance, ranging data, image data, data identifying detected and/or classified objects including current object states and predicted object locations and/or trajectories, motion plans, machine-learned models, rules, etc. as described herein. In some implementations, the machine learning computing system 930 can obtain data from one or more memory device(s) that are remote from the system 930.

The memory 934 can also store computer-readable instructions 938 that can be executed by the one or more processors 932. The instructions 938 can be software written in any suitable programming language or can be implemented in hardware. Additionally, or alternatively, the instructions 938 can be executed in logically and/or virtually separate threads on processor(s) 932.

For example, the memory 934 can store instructions 938 that when executed by the one or more processors 932 cause the one or more processors 932 to perform any of the operations and/or functions described herein, including, for example, operations 1002-1020 of FIG. 10.

In some implementations, the machine learning computing system 930 includes one or more server computing devices. If the machine learning computing system 930 includes multiple server computing devices, such server computing devices can operate according to various computing architectures, including, for example, sequential computing architectures, parallel computing architectures, or some combination thereof.

In addition or alternatively to the model(s) 910 at the computing system 902, the machine learning computing system 930 can include one or more machine-learned models 940. As examples, the machine-learned models 940 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

As an example, the machine learning computing system 930 can communicate with the computing system 902 according to a client-server relationship. For example, the machine learning computing system 930 can implement the machine-learned models 940 to provide a web service to the computing system 902. For example, the web service can provide an autonomous vehicle motion planning service.

Thus, machine-learned models 910 can be located and used at the computing system 902 and/or machine-learned models 940 can be located and used at the machine learning computing system 930.

In some implementations, the machine learning computing system 930 and/or the computing system 902 can train the machine-learned models 910 and/or 940 through use of a model trainer 960. The model trainer 960 can train the machine-learned models 910 and/or 940 using one or more training or learning algorithms. One example training technique is backwards propagation of errors. In some implementations, the model trainer 960 can perform supervised training techniques using a set of labeled training data. In other implementations, the model trainer 960 can perform unsupervised training techniques using a set of unlabeled training data. The model trainer 960 can perform a number of generalization techniques to improve the generalization capability of the models being trained. Generalization techniques include weight decays, dropouts, or other techniques.

In particular, the model trainer 960 can train a machine-learned model 910 and/or 940 based on a set of training data 962. The training data 962 can include, for example, a plurality of sets of ground truth data, each set of ground truth data including a first portion and a second portion. The first portion of ground truth data can include an example data matrix (e.g., such as a data matrix 500 of FIG. 5), while the second portion of ground truth data can correspond to a class predictions and/or location estimations (e.g., class predictions 702 and/or location estimations 704 of FIG. 7) that are manually and/or automatically labeled as correct or incorrect.

The model trainer 960 can train a machine-learned model 910 and/or 940, for example, by using one or more sets of ground truth data in the set of training data 962. For each set of ground truth data including a first portion (e.g., an example data matrix) and second portion (e.g., corresponding class prediction and/or location estimate), model trainer 960 can: provide the first portion as input into the machine-learned model 910 and/or 940; receive at least one class prediction and/or location estimation as an output of the machine-learned model 910 and/or 940; and evaluate an objective function that describes a difference between the at least one class prediction and/or location estimation received as an output of the machine-learned model 910 and/or 940 and the second portion of the set of ground truth data. The model trainer 960 can train the machine-learned model 910 and/or 940 based at least in part on the objective function. As one example, in some implementations, the objective function can be back-propagated through the machine-learned model 910 and/or 940 to train the machine-learned model 910 and/or 940. In such fashion, the machine-learned model 910 and/or 940 can be trained to provide a correct class prediction and/or location/properties estimation based on the receipt of a multi-channel data matrix generated in part from range-view LIDAR data. The model trainer 960 can be implemented in hardware, firmware, and/or software controlling one or more processors.

The computing system 902 can also include a network interface 924 used to communicate with one or more systems or devices, including systems or devices that are remotely located from the computing system 902. The network interface 924 can include any circuits, components, software, etc. for communicating with one or more networks (e.g., 980). In some implementations, the network interface 924 can include, for example, one or more of a communications controller, receiver, transceiver, transmitter, port, conductors, software, and/or hardware for communicating data. Similarly, the machine learning computing system 930 can include a network interface 964.

The network(s) 980 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 980 can be accomplished, for instance, via a network interface using any type of protocol, protection scheme, encoding, format, packaging, etc.

FIG. 9 illustrates one example computing system 900 that can be used to implement the present disclosure. Other computing systems can be used as well. For example, in some implementations, the computing system 902 can include the model trainer 960 and the training dataset 962. In such implementations, the machine-learned models 910 can be both trained and used locally at the computing system 902. As another example, in some implementations, the computing system 902 is not connected to other computing systems.

In addition, components illustrated and/or discussed as being included in one of the computing systems 902 or 930 can instead be included in another of the computing systems 902 or 930. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

FIG. 10 depicts a flowchart diagram of an example method 1000 of range-view object detection according to example embodiments of the present disclosure. One or more portion(s) of the method 1000 can be implemented by one or more computing devices such as, for example, the computing device(s) 129 within vehicle computing system 106 of FIG. 1, or computing system 902 of FIG. 9. Moreover, one or more portion(s) of the method 1000 can be implemented as an algorithm on the hardware components of the device(s) described herein (e.g., as in FIGS. 1, 2, and 4) to, for example, detect objects within sensor data.

At 1002, one or more computing devices within a computing system can receive LIDAR sweep data. In some embodiments, a perception system implemented in the vehicle computing system, such as perception system 110 of FIG. 1, can generate the LIDAR sweep data received at 1002 based on LIDAR sensor data received from one or more ranging devices included in a sensor system, such as sensor system including sensor(s) 104 of FIG. 1. Such LIDAR sensor data can include data regarding locations of points associated with objects within a surrounding environment of an autonomous vehicle (e.g., data indicating the locations (relative to the LIDAR device) of a number of points that correspond to objects that have reflected a ranging laser). For example, in some embodiments, the LIDAR sweep data received at 1002 can be generated by a sweep builder to include an approximately 360 degree view of the LIDAR sensor data (e.g., including LIDAR data points received from an approximately 360 degree horizontal periphery around the autonomous vehicle).

At 1004, one or more computing devices in a computing system can generate a multi-channel data matrix based, at least in part, on the LIDAR sweep data. For example, in some embodiments, the perception system implemented in the vehicle computing system can generate a multi-channel data matrix. In some implementations, the multi-channel data matrix can correspond to a multi-channel data matrix 500 such as depicted in FIG. 5 that includes one or more of five different range-view channels, such as a Range channel, a Height channel, an Intensity channel, an Absence of LIDAR Return channel, and an LBS Foreground channel.

At 1006, the one or more computing devices within a computing system can input the multi-channel data matrix into a machine-learned model, such as a convolutional neural network, for example, to be used in generating machine-learned model output data (e.g., convolutional neural network output data). A machine-learned model into which the multi-channel data matrix can be provided as input at 1006 can correspond, for example, to a machine-learned model 410 of FIG. 4, machine-learned model 604 of FIG. 6, and/or machine-learned model 910 and/or 940 of FIG. 9.

At 1008, the one or more computing devices within a computing system can receive a prediction of the class of a LIDAR point at a cell of the data matrix as a model output. For example, a class prediction received as a model output at 1008 can correspond to a class prediction 702 as described with reference to FIG. 7. In some embodiments, the class prediction received as a model output at 1008 can include a class probability. In some embodiments, the class prediction received as a model output at 1008 can, additionally or alternatively, include a confidence score indicative of a determined likelihood that the predicted class of an object is correct.

At 1010, the one or more computing devices within a computing system can also receive an estimation of the location of that LIDAR point, as well as other properties of the object, as a model output. For example, a location estimation received as a model output at 1010 can correspond to a location estimation 704 as described with reference to FIG. 7. In some embodiments, the location estimation received as a model output at 1010 can include an instance center, an orientation, a width, and a height. In some embodiments, the location estimation width and height can be predictions of the width and height of a box (or other polygon) in which the LIDAR point lies, for example. In some embodiments, the location estimation received as a model output at 1010 can comprise predictions/estimations of one or more properties of the object such as one or more of position, heading, size, velocity, and acceleration.

At 1012, the one or more computing devices within a computing system can perform post processing on the machine-learned model outputs to create object segments and/or polygons for object candidates. For example, in some embodiments the one or more computing devices within a computing system can perform one or more post processing operations. At 1014, the one or more computing devices within a computing system can predict the segmentation of object instances based on the class predictions (e.g., class probabilities) and the instance centers of the location estimations. At 1016, the one or more computing devices within a computing system can generate a bounding box estimation for each object instance based on the instance center, the orientation, the height, and the width in the location estimation. At 1018, the one or more computing devices within a computing system can perform non-maxima suppression, for example, to remove and/or reduce any overlapping bounding boxes for a segmented object instance.

At 1020, the one or more computing devices within a computing system can provide the object candidates (e.g., the object segments and/or polygons), for example, for use in tracking and classifying objects of interest in the perception system implemented in the vehicle computing system.

Although FIG. 10 depicts steps performed in a particular order for purposes of illustration and discussion, the methods of the present disclosure are not limited to the particularly illustrated order or arrangement. The various steps of the method 1000 can be omitted, rearranged, combined, and/or adapted in various ways without deviating from the scope of the present disclosure.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices. While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of detecting objects of interest comprising:
   receiving, by a computing system comprising one or more computing devices, LIDAR data comprising a plurality of LIDAR data points from one or more LIDAR sensors configured to transmit ranging signals relative to an autonomous vehicle;
   generating, by the computing system, a data matrix comprising a plurality of data channels based, at least in part, on the LIDAR data, wherein at least one of the plurality of data channels within the data matrix comprises LIDAR Background Subtraction foreground data indicative of whether each of the plurality of LIDAR data points is a foreground LIDAR data point remaining after LIDAR Background Subtraction is applied to the LIDAR data received from the one or more LIDAR sensors;
   inputting, by the computing system, the data matrix comprising a plurality of data channels to a machine-learned model;
   receiving, by the computing system as a first output of the machine-learned model, a class prediction for each of one or more different portions of the data matrix;
   receiving, by the computing system as a second output of the machine-learned model, a properties estimation associated with each class prediction generated for the data matrix;
   generating, by the computing system, one or more object segments based at least in part on the class predictions and properties estimations; and
   providing, by the computing system, the one or more object segments to an object classification and tracking application.

2. The computer-implemented method of claim 1, wherein the LIDAR data comprises LIDAR sweep data corresponding to LIDAR point data received around an approximately 360 degree horizontal view around the autonomous vehicle, and wherein the method further comprises generating, by the computing system, the LIDAR sweep data based on the LIDAR data received from the one or more LIDAR sensors.

3. The computer-implemented method of claim 1, wherein at least one of the plurality of data channels within the data matrix comprises LIDAR point range data indicative of how far each of the plurality of LIDAR data points is from the one or more LIDAR sensors, and wherein at least another one of the plurality of data channels within the data matrix comprises LIDAR point height data indicative of a height above ground for each of the plurality of LIDAR data points.

4. The computer-implemented method of claim 1, wherein at least one of the plurality of data channels within the data matrix comprises intensity data indicative of an energy intensity of a returned ranging signal received back at the one or more LIDAR sensors after the one or more LIDAR sensors transmits the ranging signals relative to the autonomous vehicle.

5. The computer-implemented method of claim 1, wherein at least one of the plurality of data channels within the data matrix comprises absence of LIDAR return data indicative of data matrix cells for which no ranging signal was returned after the one or more LIDAR sensors transmits the ranging signals relative to the autonomous vehicle.

6. The computer-implemented method of claim 1, wherein the data matrix comprises at least five data channels comprising LIDAR point range data indicative of how far each of the plurality of LIDAR data points is from the one or more LIDAR sensors, LIDAR point height data indicative of a height above ground of each of the plurality of LIDAR data points, intensity data indicative of an energy intensity of a returned ranging signal received back at the one or more LIDAR sensors after transmission, absence of LIDAR return data indicative of data matrix cells for which no ranging signal was returned after transmission by the one or more LIDAR sensors, and the LIDAR Background Subtraction foreground data indicative of whether each of the plurality of LIDAR data points is a foreground LIDAR data point remaining after LIDAR Background Subtraction is applied to the LIDAR data from the one or more LIDAR sensors.

7. The computer-implemented method of claim 1, wherein the machine-learned model comprises a convolutional neural network.

8. The computer-implemented method of claim 1, the method further comprising:
   predicting, by the computing system, an instance segmentation for each of one or more detected instances based at least in part on the class predictions and the properties estimations; and
   generating, by the computing system, a bounding box estimation for each instance segmentation based at least in part on the class predictions and the properties estimations.

9. The computer-implemented method of claim 8, wherein predicting the instance segmentation comprises predicting the instance segmentation based at least in part on a class probability and an instance center determined based on the class predictions and the properties estimations; and
   wherein generating the bounding box estimation comprises generating the bounding box estimation based at least in part on an instance center, an orientation, a width, and a height determined based at least in part on the properties estimations.

10. An object detection system comprising:
    one or more processors;
    a machine-learned prediction model, wherein the prediction model has been trained to receive a data matrix comprising multiple channels of LIDAR-associated data and, in response to receipt of the data matrix comprising multiple channels of LIDAR-associated data, output one or more class predictions for different portions of the data matrix; and
    at least one tangible, non-transitory computer readable medium that stores instructions that, when executed by the one or more processors, cause the one or more processors to perform operations, the operations comprising:
        obtaining a data matrix comprising multiple channels of LIDAR-associated data, wherein at least one of the multiple channels of LIDAR-associated data comprises LIDAR Background Subtraction foreground data indicative of whether a LIDAR data point is a foreground LIDAR data point remaining after LIDAR Background Subtraction is applied to the LIDAR data received from the one or more LIDAR sensors;
        inputting the data matrix comprising multiple channels of LIDAR-associated data into the machine-learned prediction model; and
        receiving, as output of the machine-learned prediction model, one or more class predictions for one or more different portions of the data matrix.

11. The object detection system of claim 10, wherein the machine-learned prediction model has been further trained to output a properties estimation for one or more types of predicted classes identified from the one or more class predictions for the one or more different portions of the data matrix, and
    wherein the operations further comprise receiving, as an output of the machine-learned prediction model, a properties estimation associated with each of the one or more class predictions for the one or more different portions of the data matrix.

12. The object detection system of claim 11, wherein the operations further comprise generating one or more object segments based at least in part on the class predictions and the properties estimations.

13. The object detection system of claim 10, wherein the output of the machine-learned prediction model includes a class prediction for each cell of the data matrix comprising LIDAR point data.

14. The object detection system of claim 10, wherein the machine-learned prediction model comprises a convolutional neural network.

15. The object detection system of claim 10, wherein the operations further comprise:
    predicting an instance segmentation for each of one or more detected instances based at least in part on a class probability and an instance center generated at least in part from the class predictions and the properties estimations; and
    generating a bounding box estimation for each instance segmentation based at least in part on an instance center, an orientation, a width, and a height generated at least in part from the properties estimations.

16. An autonomous vehicle comprising:
    a sensor system comprising at least one LIDAR sensor configured to transmit ranging signals relative to the autonomous vehicle and to generate LIDAR data comprising a plurality of LIDAR data points; and
    a vehicle computing system comprising:
        one or more processors; and
        at least one tangible, non-transitory computer readable medium that stores instructions that, when executed by the one or more processors, cause the one or more processors to perform operations, the operations comprising:
            receiving LIDAR data from the sensor system;
            generating a data matrix comprising a plurality of data channels based at least in part on the LIDAR data, wherein at least one of the plurality of data channels within the data matrix comprises LIDAR Background Subtraction foreground data indicative of whether each of the plurality of LIDAR data points is a foreground LIDAR data point remaining after LIDAR Background Subtraction is applied to LIDAR data from the sensor system;

providing the data matrix comprising the plurality of data channels as input to a machine-learned model;

receiving, as a first output of the machine-learned model, a class prediction for each cell of the data matrix; and receiving, as a second output of the machine-learned model, a properties estimation for each cell of the data matrix.

17. The autonomous vehicle of claim 16, wherein the operations further comprise:

generating one or more object segments based at least in part on the class predictions and the properties estimations, and wherein the object segments are used in classifying and tracking objects of interest to the operation of the autonomous vehicle.

18. The autonomous vehicle of claim 16, wherein the plurality of data channels within the data matrix further comprise one or more of:

LIDAR point range data indicative of how far each of the plurality of LIDAR data points is from the at least one LIDAR sensor, LIDAR point height data indicative of a height above ground of each of the plurality of LIDAR data points, intensity data indicative of an energy intensity of a returned ranging signal received back at the at least one LIDAR sensor after the at least one LIDAR sensor transmits ranging signals relative to the autonomous vehicle, and absence of LIDAR return data indicative of data matrix cells for which no ranging signal is returned after the at least one LIDAR sensor transmits ranging signals relative to the autonomous vehicle.

19. The autonomous vehicle of claim 16, wherein the operations further comprise:

predicting an instance segmentation for each of one or more detected instances based at least in part on a class probability and an instance center generated at least in part from the class predictions and the properties estimations; and generating a bounding box estimation for each instance segmentation based at least in part on an instance center, an orientation, a width, and a height generated at least in part from the properties estimations.

* * * * *